(12) United States Patent
Carter et al.

(10) Patent No.: US 9,160,608 B2
(45) Date of Patent: Oct. 13, 2015

(54) COMMUNICATION SESSION PROCESSING

(71) Applicant: Metaswitch Networks Ltd., Enfield (GB)

(72) Inventors: Oliver James Carter, Hertford (GB); Christopher Richard Gibbs, London (GB); Oliver Fairless Nicolson, Enfield (GB); Phillip James Springett, Oswestry (GB)

(73) Assignee: METASWITCH NETWORKS LTD, Enfield (GB)

( * ) Notice: Subject to any disclaimer, the term of this patent is extended or adjusted under 35 U.S.C. 154(b) by 236 days.

(21) Appl. No.: 13/793,658

(22) Filed: Mar. 11, 2013

(65) Prior Publication Data

US 2013/0188649 A1    Jul. 25, 2013

Related U.S. Application Data

(63) Continuation of application No. 13/546,559, filed on Jul. 11, 2012, now abandoned.

(30) Foreign Application Priority Data

Jul. 11, 2011   (GB) .................................. 1111862.7

(51) Int. Cl.
| H04L 12/66 | (2006.01) |
| H04L 29/08 | (2006.01) |
| H04M 7/00 | (2006.01) |
| H04L 29/06 | (2006.01) |

(52) U.S. Cl.
CPC ........ *H04L 29/08621* (2013.01); *H04L 65/104* (2013.01); *H04L 65/1006* (2013.01); *H04L 65/1043* (2013.01); *H04L 65/1053* (2013.01); *H04L 65/80* (2013.01); *H04M 7/006* (2013.01); *H04L 63/0428* (2013.01)

(58) Field of Classification Search
USPC .............. 370/252, 231, 352, 229, 230.1, 236, 370/235, 356, 412, 392, 493, 353, 354, 358, 370/355, 389, 394, 398, 401; 709/224, 223, 709/234, 235; 379/211.02, 212.01
See application file for complete search history.

(56) References Cited

U.S. PATENT DOCUMENTS 7,764,612 B2 *   7/2010   Manuja et al. ................ 370/231

FOREIGN PATENT DOCUMENTS

| JP | 2005204216 A | 7/2005 |
| WO | 2006128488 A1 | 12/2006 |

* cited by examiner

*Primary Examiner* — Chi H Pham
*Assistant Examiner* — Alexander O Boakye
(74) *Attorney, Agent, or Firm* — EIP US LLP

(57) ABSTRACT

Measures for use in processing communication sessions in a telecommunications network are provided. Each communication session has a signalling path spanning a plurality of devices including one or more intermediate network devices and at least two endpoint devices, the signalling path comprising a plurality of signalling segments, each segment being between two devices in the plurality of devices. A first signalling message, comprising a first identifier associated with the communication session, is received via a first signalling segment for a communication session. At least part of the first identifier is transformed using a deterministic encryption algorithm to generate a second identifier. A second signalling message, comprising the second identifier, is transmitted via a second signalling segment for the communication session to associate the second identifier with the communication session.

17 Claims, 3 Drawing Sheets

COMMUNICATION SESSION PROCESSING

CROSS-REFERENCE TO RELATED APPLICATIONS

This application is a Continuation of U.S. patent application Ser. No. 13/546,559, filed on Jul. 11, 2012, which claims priority to foreign Patent Application No. GB 1111862.7, filed on Jul. 11, 2011, the disclosures of which are incorporated herein by reference in their entirety.

FIELD OF THE INVENTION

The present disclosure relates to processing communication sessions in a telecommunications network.

BACKGROUND OF THE INVENTION

Packet-based telecommunications networks typically include application gateway devices deployed at the boundaries between networks. For example, a Session Border Controller (SBC) is deployed at the border of a Voice Over Internet Protocol (VoIP) network and protects the network by policing communication sessions such as voice calls (or 'VoIP calls') flowing into or out of that network. Communication sessions such as voice calls are commonly set up using the Session Initiation Protocol (SIP). Such communication sessions have a signalling path spanning a plurality of devices including one or more intermediate network devices, such as SBCs and softswitches, and at least two endpoint devices, such as user terminals. The signalling path comprises a plurality of signalling segments, each segment being between two devices in the plurality of devices.

An SBC can employ network address translation (NAT) to hide the IP addresses of devices in one network from devices in another network, when communicating via a signalling segment. This typically involves the SBC replacing network addresses of signalling messages, and storing a network address lookup table for translating between the network addresses. In the case of SIP signalling messages, such network addresses can be Internet Protocol (IP addresses) contained in session or associated identifiers.

Various different references used in signalling messages refer to the correct communication session or associated identifiers. In the case of SIP signalling messages, there are many SIP extension functions, some of which, such as call transfer, may reference a session while it is still in existence, and others of which, such as voice quality reporting, may reference the communication session whilst it is still in existence and also after it has terminated. Such SIP extension functions are continually being developed.

There is therefore a need to provide improved methods for processing session identifiers in a signalling segment for a communications session.

SUMMARY OF THE INVENTION

In accordance with embodiments, there is a method of processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:

receiving, via a first signalling segment for a communication session, a first signalling message comprising a first identifier associated with the communication session;

transforming at least part of the first identifier using a deterministic encryption algorithm to generate a second identifier; and transmitting, via a second signalling segment for the communication session, a second signalling message comprising the second identifier to associate the second identifier with the communication session.

Hence, embodiments provide efficient network address hiding in session identifiers without the need to store network address translation lookup tables. Employing a deterministic, encrypted mapping allows devices with the necessary encryption/decryption keys to correctly transform the identifiers wherever they are referred to in subsequent signalling messages sent via the same signalling segment, regardless of whether the original communication session is still in progress.

In embodiments, the transformation is carried out by a device transmitting the second signalling message via the signalling segment. The device receiving the second signalling message via the signalling segment need not perform inverse translation of the received second identifier. In embodiments, the device receiving the second signalling message via the signalling segment does not perform inverse translation of the received second identifier, nor indeed of any other identifiers relating to the same session. Since the transformation is deterministic, and the same value is used for the transformation, the same identifier is received by the receiving device. Hence, the transformation may be performed independently of knowledge, at the receiving end, of the transformation having been applied. Hence, these devices may be standardised devices which interoperate according to predetermined standards, such as the SIP standard. Hence, in embodiments in which the transformation is applied in a particular device, for example in an SBC, standardised receiving devices may be used, for example standardised softswitches and standardised user terminals implementing standard protocols. Moreover, encryption keys need not be exchanged between the devices for the purpose of network address hiding as the receiving device need not perform decryption of session or associated identifiers.

In embodiments, the first signalling message comprises a first communication session setup signalling message for the communication session and the second signalling message comprises a second communication session setup signalling message for the communication session. Hence, embodiments provide efficient network address hiding during the communication session setup phase.

In embodiments, the method comprises receiving a third signalling message comprising the first identifier, transforming at least part of the first identifier from the third signalling message using the deterministic encryption algorithm to generate the second identifier associated with the communication session, and transmitting a fourth signalling message comprising the second identifier generated by the transformation of at least part of the first identifier from the third signalling message. The third signalling message may comprise a first quality reporting signalling message for the communication session and may be received via the first signalling segment, and the fourth signalling message may comprise a second quality reporting signalling message and be transmitted via the second signalling segment. Hence, embodiments provide efficient network address hiding after the communication session setup phase by using the same encryption transformation applied during the communication session setup phase, for example in relation to communication session quality reporting.

In embodiments, the first identifier is received at an intermediate network device, and the method comprises determining that the received first identifier does not comprise at least a portion identifying the intermediate network device, wherein the transforming of at least part of the first identifier is carried out in response to the determination. Hence, a decision to apply an encryption transformation of the identifier can be taken.

In embodiments, the method comprises receiving a third signalling message comprising the second identifier, transforming at least part of the second identifier from the third signalling message using an inverse of the deterministic encryption algorithm to generate the first identifier associated with the communication session, and transmitting a fourth signalling message comprising the first identifier generated from the transformation of at least part of the second identifier from the third signalling message. The third signalling message may comprise a first quality reporting signalling message for the communication session and be received via the second signalling segment, and the fourth signalling message may comprise a second quality reporting signalling message and be transmitted via the first signalling segment. Hence, embodiments provide efficient network address hiding after the communication session setup phase by using an inverse of the encryption transformation applied during the communication session setup phase, for example in relation to communication session quality reporting.

In embodiments, the second identifier is received at an intermediate network device, and the method comprises determining that the received second identifier comprises at least a portion identifying the intermediate network device, wherein the transforming of at least part of the second identifier is carried out in response to the determination. Hence, a decision to apply a decryption transformation of the identifier can be taken.

In embodiments, the first quality reporting signalling message is received during the communication session. In embodiments, the first quality reporting signalling message is received after termination of the communication session. Hence, embodiments provide processing of quality reports without the need to store network address translation lookup tables during the communication session or maintain such network address translation lookup tables after termination of the communication session.

In embodiments, the first signalling message comprises a first quality reporting signalling message for the communication session and the second signalling message comprises a second quality reporting signalling message for the communication session. Hence, the network address hiding can function in relation to communication session quality reporting functionality.

In embodiments, the method comprises detecting that the first signalling message is of a communication session quality reporting type, wherein the transformation is carried out in response to the detection. Hence, if monitoring of the type of signalling messages indicates a quality reporting type, a device can accurately detect that appropriate transformation of the identifier should be carried out such that downstream devices in the signalling path can recognise the correct communication session to which the quality reporting signalling messages relate.

In embodiments, the first identifier includes a portion comprising a network address for at least one device in the signalling path of the communication session. Hence, a network address of the at least one device can be hidden from other devices in the signalling path for the communication session.

In embodiments at least one device comprises an endpoint device, and the first signalling message is generated by the endpoint device, whereas in other embodiments, the at least one device comprises a softswitch, and the first signalling message is generated by the softswitch. Hence, access to an identifier for a device can be prevented. This may for example be useful in preventing an address for an endpoint device which is only valid in a private network from being made available externally to the network. This may also be useful in preventing hacking of an intermediate network device such as a softswitch acting as a quality reporting collector entity by one or more endpoint devices.

In embodiments, the communication session comprises a Session Initiation Protocol (SIP) communication session, the first and second signalling messages comprise first and second SIP signalling messages, and the first and second identifiers are session identifiers contained in respective session identifier fields of the first and second SIP signalling messages. Hence, in a SIP environment IP addresses of devices in the signalling path for a session can be hidden when referenced in session identifier fields used in a message sent along the a particular signalling segment.

In embodiments, the first and second signalling messages comprise one or more of SIP INVITE messages, SIP SUBSCRIBE messages, and SIP REFER messages. In other embodiments, the first and second signalling messages comprise one or more of SIP NOTIFY messages, and SIP PUBLISH messages. Hence, the described techniques can be employed in relation to a number of different types of SIP setup and reporting signalling messages.

In embodiments, the communication session comprises a Voice over Internet Protocol (VoIP) or Communications over Internet Protocol (CoIP) call.

In embodiments, the transformation of the first identifier is carried out by a session border controller located between the first and second signalling segments, the transformation is applied to the entire contents of the first identifier and the result of the transformation is added as a prefix to a network address of the session border controller to form the second identifier. Hence, a session border controller is able to make a decision as to whether an encryption or decryption transformation is applied to the identifier which allows association of the signalling message to the correct communication session by a downstream device in the signalling path for the session.

In accordance with embodiments, there is a method of processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:
  receiving, via a first signalling segment for a communication session, a first communication session setup signalling message comprising a first identifier associated with the communication session;
  transforming at least part of the first identifier using a deterministic encryption algorithm to generate a second identifier;
  transmitting, via a second signalling segment for the communication session, a second communication session setup signalling message comprising the second identifier to associate the second identifier with the communication session;

receiving, via the second signalling segment, a first quality reporting signalling message for the communication session, the first quality reporting signalling message comprising the second identifier;

transforming at least part of the second identifier from the first quality reporting signalling message using an inverse of the deterministic encryption algorithm to generate the first identifier associated with the communication session; and transmitting, via the first signalling segment, a second quality reporting signalling message comprising the first identifier generated from the transforming.

In accordance with embodiments, there is a method of processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:

receiving, via a first signalling segment for a communication session, a first communication session setup signalling message comprising a first identifier associated with the communication session;

transforming at least part of the first identifier using a deterministic encryption algorithm to generate a second identifier;

transmitting, via a second signalling segment for the communication session, a second communication session setup signalling message comprising the second identifier to associate the second identifier with the communication session;

receiving, via the first signalling segment, a first quality reporting signalling message for the communication session, the first quality reporting signalling message comprising the first identifier;

further transforming at least part of the first identifier from the first quality reporting signalling message using the deterministic encryption algorithm to generate the second identifier associated with the communication session; and transmitting, via the second signalling segment, a second quality reporting signalling message comprising the second identifier generated from the further transforming.

In accordance with embodiments, there is apparatus adapted to perform the methods of the various different embodiments described herein.

In accordance with embodiments, there is a session border controller for processing communication sessions in a telecommunications network, each communication session having a signalling path spanning a plurality of devices including one or more session border controllers, a softswitch and at least two endpoint devices, the signalling path comprising a first signalling segment located between one of the endpoint devices and the session border controller, and a second signalling segment located between the session border controller and the softswitch, the session border controller comprising:

a first interface configured to receive, via the first signalling segment for a communication session, a first signalling message comprising a first identifier associated with the communication session;

a processor configured to transform at least part of the first identifier using a deterministic encryption algorithm to generate a second identifier; and a second interface configured to transmit, via the second signalling segment for the communication session, a second signalling message comprising the second identifier to associate the second identifier with the communication session.

In accordance with embodiments, there is computer software adapted to perform the methods of the various different embodiments described herein.

In accordance with embodiments, there is a computer program product comprising a non-transitory computer-readable storage medium having computer readable instructions stored thereon, the computer readable instructions being executable by a computerized device to cause the computerized device to perform a method for processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:

receiving, via a first signalling segment for a communication session, a first signalling message comprising a first identifier associated with the communication session;

transforming at least part of the first identifier using a deterministic encryption algorithm to generate a second identifier; and transmitting, via a second signalling segment for the communication session, a second signalling message comprising the second identifier to associate the second identifier with the communication session.

Further features and advantages of embodiments will become apparent from the following description of embodiments, given by way of example only, which is made with reference to the accompanying drawings.

DETAILED DESCRIPTION

Figure 1:
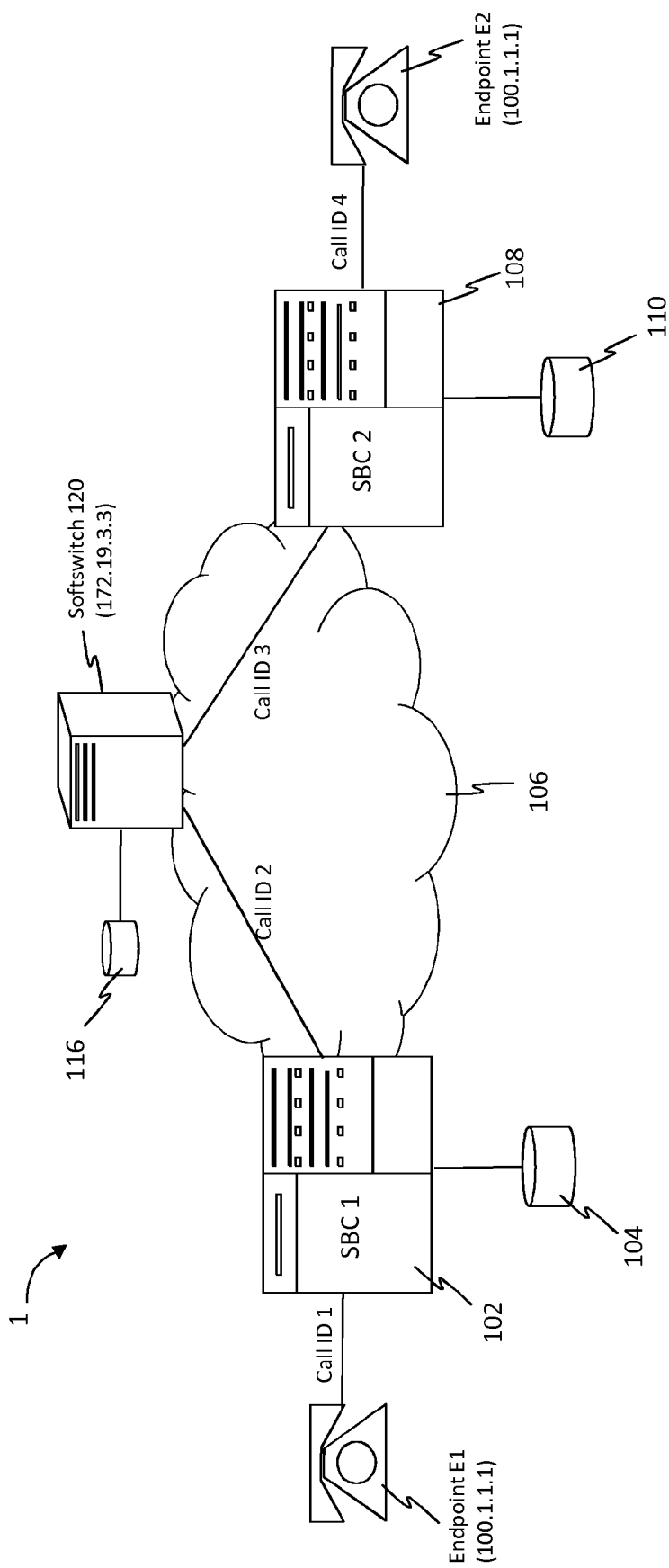
FIG. 1 is a system diagram according to embodiments.

FIG. 1 is a system diagram according to embodiments. FIG. 1 illustrates an example telecommunications network 1 that includes endpoint devices E1 and E2 and a plurality of intermediate network devices. In this case, the plurality of intermediate network devices includes application gateway 102, application gateway 108 and softswitch 120. Telecommunications network 1 may contain more endpoint devices and more intermediate network devices (not shown).

Endpoint device E1 is connected to application gateway 102 (denoted as 'SBC 1' in FIG. 1) which is in turn connected to network 106. Endpoint device E1 may be located in a private Local Area Network (LAN) with SBC 1 located at the border between the LAN and network 106. Network 106 may comprise one or more packet-switched networks such as the Internet and/or circuit-switched networks such as a Public Switched Telephone Network (PSTN). Endpoint device E2 is connected to application gateway 108 (denoted as 'SBC 2' in FIG. 1) which is in turn connected to network 106. Endpoint device E2 may be located in a private LAN with SBC 2 located at the border between the LAN and network 106. Application gateways 102 and 108 have access to databases 104 and 110 respectively.

Softswitch 120 is responsible for routing communication sessions such as voice calls to and from a number of endpoint devices including E1 and E2. Softswitch 120 has access to database 116. A softswitch is an entity or cluster of entities, also known as a Media Gateway Controllers (MGCs) or call agent. A softswitch provides the intelligence that controls packet-based telephony services, including the ability to select processes that can be applied to a communication session, routing for a communication session within the network based on signalling and subscriber database information, the ability to transfer control of the communication session to another network element and management functions such as provisioning, fault detection and billing. A softswitch also provide the architecture for enabling conversion between signalling protocols such as the Signalling System #7 (SS7) and the Session Initiation Protocol (SIP). Softswitch 120 acts as a collector network entity in relation to communication session quality reporting functionality, such functionality being described in more detail below.

Endpoint devices E1 and E2 are capable of communicating with each other in communication sessions and could for example comprise VoIP telephones, or computing devices such as personal computers configured to conduct communications sessions. Each application gateway 102, 108 could for example take the form of a Session Border Controller (SBC), a computer server that includes hardware and/or software implementing a SIP proxy server, or other forms of application gateway.

An application gateway will typically (but not always) be located on the boundary between two different domains or parts of a telecommunications network, for example on the boundary between a private LAN and the Internet, with the application gateway being responsible for policing communication sessions in and out of the private LAN.

In the following example embodiments, the user of E1 initiates a communication session such as a voice call with the user of E2 such that a communication session between endpoint devices E1 and E2 is established, i.e. endpoint device E1 is an originating endpoint device and endpoint device E2 is a terminating endpoint device. The communications session will have a media path for transfer of media data between endpoint devices E1 and E2 and a signalling path for transfer of signalling information for setup and control of the communication session.

In embodiments, the signalling path for the communication session spans endpoint devices E1 and E2 and intermediate network devices SBC 1, SBC 2 and softswitch 120. The signalling path for the communication session comprises a plurality of signalling segments, with each signalling segment being between two devices. The signalling path between endpoint device E1 and SBC 1 forms a first signalling segment, the signalling path between SBC 1 and softswitch 120 forms a second signalling segment, the signalling path between softswitch 120 and SBC 2 forms a third signalling segment and the signalling path between SBC 2 and endpoint device E2 forms a fourth signalling segment.

Endpoint device E1 has a network address in the form of an IP address, in this case 100.1.1.1. Similarly, endpoint device E2 has an IP address of 100.1.1.2 and softswitch 120 has an IP address of 172.19.3.3. SBC 1 has a network address in the form of a domain address @sbc1_ss.com and SBC 2 has a network address in the form of a domain address @sbc2_pbx2.com.

Figure 2:
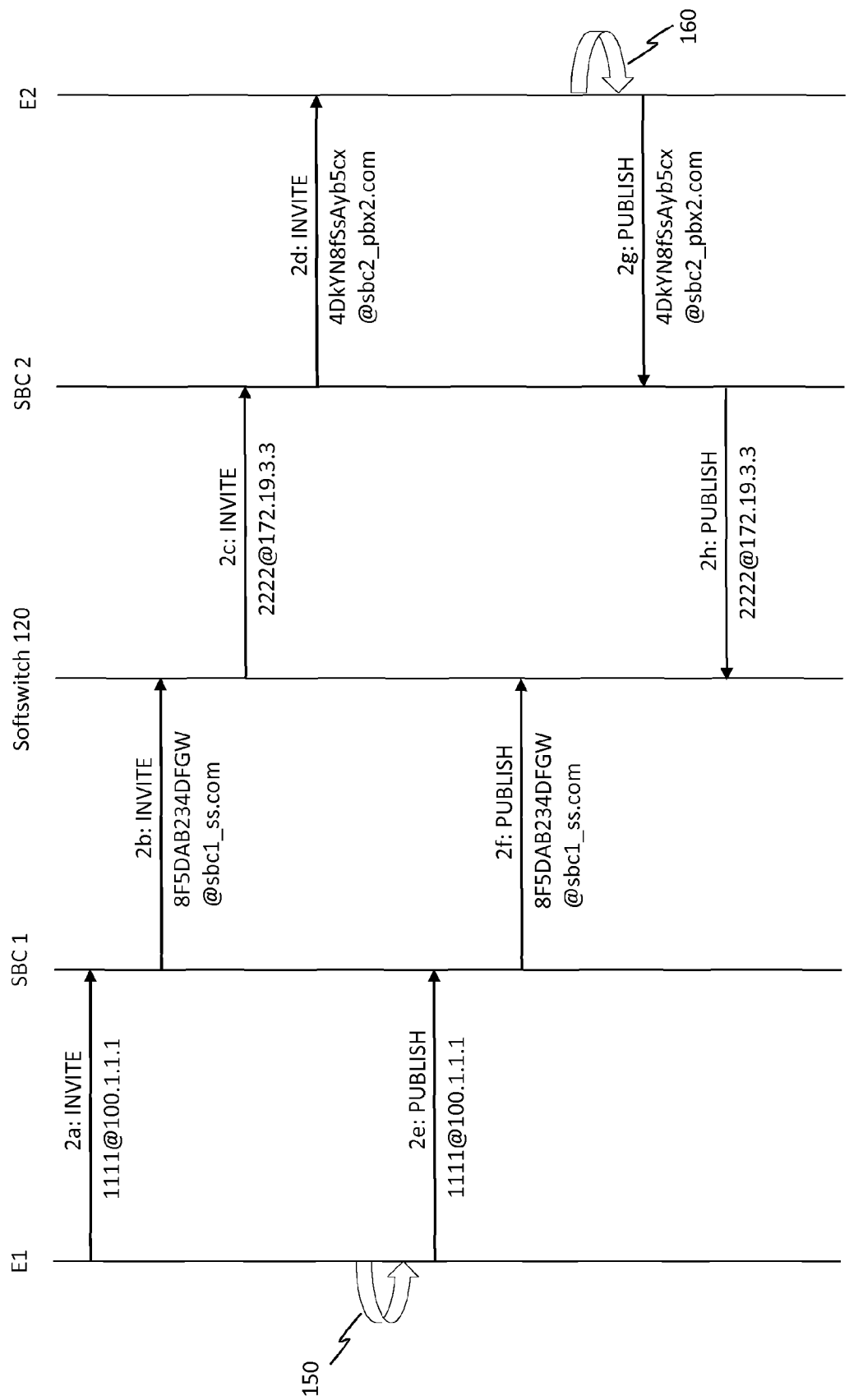
FIG. 2 is a signalling message flow diagram according to embodiments.

FIG. 2 is a signalling message flow diagram according to embodiments. In these embodiments, processing of SIP signalling messages for a communication session conducted between endpoint devices E1 and E2 is described. FIG. 2 shows a number of SIP signalling messages being transmitted via different segments of a communication session; the type of SIP message and message sequence identifier (2*a*, 2*b*, 2*c*, etc.) is given above the arrow between the respective devices of a segment and a call identifier associated with the communication session is given below the arrow.

A session identifier (which is placed in a session identifier field denoted 'Call-ID' in a SIP header of a SIP message; and may be placed in other session identifier fields denoted in various other manners, such as "CallID"; SessionID; etc. within a SIP body of a SIP message) is a unique identifier for a communication session, typically generated by the combination of a random string and a hostname or IP address of the device generating the call identifier.

In embodiments, an application gateway device which is located in the signalling path for a communication session may modify an identifier contained in a signalling message transmitted along the signalling path for the communication session in order to hide a network address relating to one or more devices in the signalling path from other devices in the signalling path. Embodiments provide methods and apparatus by which a device in the signalling path of the communication session may correctly reference an identifier associated with a communication session, such as a call identifier, when is it referred to in a subsequent signalling message for the communication session. To this aim, embodiments employ a deterministic encryption algorithm to transform identifiers such as call identifiers contained in signalling messages. Identifiers in subsequent signalling messages can be similarly transformed allowing referencing to the correct communication session by other devices.

Use of a transformation algorithm with encryption capabilities ensures hiding of network addresses to downstream devices in the signalling path. Use of a transformation algorithm with deterministic qualities ensures that the process is repeatable for subsequent signalling messages such that downstream devices in the signalling path can associate the identifiers in subsequently transformed signalling messages with the correct communication session. Use of a reversible encryption algorithm, instead of for example a one-way hash algorithm, ensures that the reverse transformation can also be achieved in subsequent signalling messages flowing in the opposite direction. Embodiments achieve efficient network address hiding without the need for application gateway devices to store and maintain network address translation lookup tables for communication sessions.

The user of originating endpoint device E1 wishes to conduct a communication session with the user of terminating endpoint device E2. Initiation of the communication session begins with appropriate user input on E1, for example selection of the user of E2 from an address book stored on E1. E1 is configured to contact application gateway SBC 1 with all communication session requests, i.e. SBC1 acts as a SIP back-to-back user agent for E1. E1 therefore transmits a communication session setup signalling message in the form of a SIP Invite signalling message to SBC 1 via the signalling segment between E1 and SBC 1 in step 2*a*. The SIP Invite message of step 2*a* contains a first identifier associated with the communication session. In this example, the first identifier is a session identifier (denoted 'Call ID 1' in FIG. 1), 1111@100.1.1.1, such being included in a Call-ID field in the SIP header of the SIP Invite message of step 2*a*. The session identifier here consists of a random string (1111) and an IP address (100.1.1.1) for endpoint device E1.

When SBC 1 receives the communication session setup signalling message of step 2*a* it transforms at least a part of the first identifier contained in the communication session setup signalling message of step 2*a* using a deterministic encryption algorithm to generate a second identifier. In order to apply the deterministic encryption algorithm, SBC 1 consults database 104 to retrieve an encryption key 304 for the deterministic encryption algorithm stored therein.

SBC 1 transmits a communication session setup signalling message comprising the second identifier in the form of a SIP Invite signalling message to softswitch 120 via the signalling segment between SBC 1 and softswitch 120 to associate the second identifier with the communication session in step 2*b*. In this example, SBC 1 creates a call identifier (denoted 'Call ID 2' in FIG. 1) by adding the result of the transformation (8F5DAB234DFGW) as a prefix to a network address (@sbc1_ss.com) of SBC 1 to form the second identifier, 8F5DAB234DFGW@sbc1_ss.com, which is included in the Call-ID field of the SIP header of the SIP Invite message of step 2*b*.

Note that the first identifier will in general contain an '@' symbol for linking the random string to an address, whereas the second identifier generated from the transformation will typically not contain an '@' symbol.

The session identifier in the signalling message of step 2*a* generated by E1 and received by SBC 1 includes a portion ('100.1.1.1') comprising a network address for endpoint device E1 which is located in the signalling path of the communication session. The session identifier in the signalling message of step 2*b* transmitted by intermediate network device SBC 1 does not include a portion comprising a network address for endpoint device E1, so network address hiding with respect to E1 may be thus achieved. The network address of E1 is thus hidden from softswitch 120.

When softswitch 120 receives the SIP Invite message of step 2*b* it stores the session identifier for the segment of the communication session between SBC 1 and softswitch 120 in database 116.

Softswitch 120 transmits a communication session setup signalling message in the form of a SIP Invite signalling message to SBC 2 via the signalling segment between softswitch 120 and SBC 2 in step 2*c*. The SIP Invite message of step 2*c* contains a third identifier associated with the communication session. In this example, the third identifier is a call identifier (denoted 'Call ID 3' in FIG. 1), 2222@172.19.3.3, which is included in the Call-ID field of the SIP header of the SIP Invite message of step 2*c*. The session identifier here consists of a random string (2222) and an IP address (172.19.3.3) for softswitch 120.

Softswitch 120 stores the session identifier for the segment of the communication session between softswitch 120 and SBC 2 in database 116.

When SBC 2 receives the communication session setup signalling message of step 2*c* it transforms at least a part of the third identifier contained in the communication session setup signalling message of step 2*c* using a deterministic encryption algorithm to generate a fourth identifier. In order to apply the deterministic encryption algorithm, SBC 2 consults database 110 to retrieve an encryption key for the deterministic encryption algorithm stored therein.

SBC 2 transmits a communication session setup signalling message comprising the fourth identifier in the form of a SIP Invite signalling message to E2 via the signalling segment between SBC 2 and E2 to associate the fourth identifier with the communication session in step 2*d*. In this example, SBC 2 creates a call identifier (denoted 'Call ID 4' in FIG. 1) by adding the result of the transformation (4DkYN8fSsAyb5cx) as a prefix to a network address (@sbc2_pbx2.com) of SBC 2 to form the fourth identifier, 4DkYN8fSs Ayb5cx@sbc2_pbx2.com, which is included in the Call-ID field of the SIP header of the SIP Invite message of step 2*d*.

The session identifier in the signalling message of step 2*c* generated by intermediate network device softswitch 120 and received by SBC 2 includes a portion ('172.19.3.3') comprising a network address for softswitch 120 which is located in the signalling path of the communication session. The session identifier in the signalling message of step 2*d* transmitted by SBC 2 does not include a portion comprising a network address for softswitch 120, so network address hiding with respect to softswitch 120 may thus be achieved. The network address of softswitch 120 is thus hidden from endpoint device E2.

During setup of a communication session between endpoint device E1 and endpoint device E2, a SIP 200 OK message will be transmitted in response to the Invite message transmitted for each segment. A SIP ACK message will then be transmitted to acknowledge receipt of each SIP 200 OK message. Such SIP 200 OK and SIP ACK messages are not depicted in FIG. 2 for clarity purposes and are not described herein in any further detail as their use in relation to the embodiments described here will be clear to one skilled in the art.

After steps 2*a* to 2*d* have been carried out, the communication session has been established and the users of E1 and E2 may communicate with each other. Media data for the communication session such as voice and/or video data is able to flow (not shown) between E1 and E2, possibly via one or more of SBC 1, SBC 2 and softswitch 120.

During, the communication session, endpoint device E1 may generate one or more statistics for the quality of communication in the communication session, for example relating to packet loss, jitter, round-trip delay time, etc. Such statistics can be reported to a collector network entity such as softswitch 120 to enable communication session quality reporting functionality.

With reference to FIG. 2, endpoint device E1 generates a communication session quality report, see item 150, in relation to the communication session established in steps 2*a* to 2*d* and transmits a first quality reporting signalling message containing the generated quality report for the communication session to SBC 1 in step 2*e*. In this case, the first quality reporting signalling message is in the form of a SIP PUBLISH signalling message transmitted to SBC 1 via the signalling segment between E1 and SBC1. The SIP PUBLISH message of step 2*e* contains the first identifier associated with the communication session, in this case 1111@100.1.1.1, which is included in a session identifier field (denoted, for example, in this embodiment as CallID) in a voice quality session report (VQSessionReport) in the SIP body of the SIP PUBLISH message of step 2*e*.

When SBC 1 receives the first quality reporting signalling message of step 2*e* it transforms at least a part of the first identifier contained in the communication session setup signalling message of step 2*e* using the deterministic encryption algorithm to generate the second identifier. In order to apply the deterministic encryption algorithm, SBC 1 consults database 104 to retrieve the encryption key for the deterministic encryption algorithm stored therein.

SBC 1 transmits a second quality reporting signalling message comprising the second identifier generated by the transformation of the first identifier contained in the communication session setup signalling message of step 2*e* in the form of a SIP PUBLISH signalling message to softswitch 120 via the signalling segment between SBC 1 and softswitch 120 in step 2*f*. In this example, SBC 1 creates a session identifier by adding the result of the transformation (8F5DAB234DFGW) as a prefix to a network address (@sbc1_ss.com) of SBC 1 to form the second identifier, 8F5DAB234DFGW@sbc1_ss.com, the whole of which, or at least the first string of which (preceding the '@' symbol) is included in the CallID field in a voice quality session report (VQSessionReport) in the SIP body of the SIP PUBLISH message of step 2f.

The session identifier in the signalling message of step 2e generated by endpoint device E1 and received by intermediate network device SBC 1 includes a portion ('100.1.1.1') comprising a network address for endpoint device E1 which is located in the signalling path of the communication session. The session identifier in the signalling message of step 2f transmitted by SBC 1 does not include a portion comprising a network address for endpoint device E1, so network address hiding with respect to E1 may thus be achieved. The network address of E1 is thus hidden from softswitch 120.

When softswitch 120 receives the SIP PUBLISH message of step 2f it examines the CallID field to find a session identifier of 8F5DAB234DFGW@sbc1_ss.com. Softswitch 120 consults database 116 and recognises that this session identifier relates to the communication session between endpoint device E1 and endpoint device E2, in particular the session identifier identified in the Call-ID field used in previous signalling for the segment between softswitch 120 and SBC 1. Softswitch 120 is thus able to react to the communication session quality report accordingly in relation to the correct communication session.

During, the communication session, endpoint device E2 may also generate one or more statistics for the quality of communication in the communication session. Such statistics can be reported to a collector network entity such as softswitch 120 to enable communication session quality reporting functionality.

With reference to FIG. 2, endpoint device E2 generates a communication session quality report, see item 160, in relation to the communication session established in steps 2a to 2d and transmits a third quality reporting signalling message containing the quality report generated for the communication session to SBC 2 in step 2g. In this case, the first quality reporting signalling message is in the form of a SIP PUBLISH signalling message transmitted to SBC 2 via the signalling segment between E2 and SBC 2. The SIP PUBLISH message of step 2g contains the fourth identifier associated with the communication session, in this case 4DkYN8fSsAyb5cx@sbc2_pbx2.com, the whole of which, or at least the first string of which (preceding the '@' symbol) is included in the CallID field in a voice quality session report (VQSessionReport) in the SIP body the SIP PUBLISH message of step 2g.

Here, the CallID includes a portion (sbc2_pbx2.com) comprising a network address for intermediate network device SBC 2 which is located in the signalling path of the communication session.

When SBC 2 receives the third quality reporting signalling message of step 2g it transforms at least a part of the fourth identifier contained in the communication session setup signalling message of step 2g using an inverse of the deterministic encryption algorithm to generate the third identifier associated with the communication session. In order to apply the inverse of the deterministic encryption algorithm, SBC 2 consults database 110 to retrieve a decryption key 306 for the inverse of the deterministic encryption algorithm stored therein.

In such embodiments, the deterministic encryption algorithm comprises a reversible deterministic encryption algorithm such that an inverse of the deterministic encryption algorithm exists. The inverse of the deterministic encryption algorithm can then be applied to implement decryption of an identifier in a signalling message transmitted in the opposite direction along the signalling path to which the deterministic encryption algorithm was previously applied.

SBC 2 transmits a fourth quality reporting signalling message comprising the third identifier generated by the transformation of the fourth identifier contained in the communication session setup signalling message of step 2g in the form of a SIP PUBLISH signalling message to softswitch 120 via the signalling segment between SBC 2 and softswitch 120 in step 2h. In this example, SBC 2 creates a session identifier for a CallID field of a voice quality session report (VQSessionReport) in the SIP body of the SIP PUBLISH message of step 2h using the result of the transformation of the fourth identifier, i.e. decryption of the fourth identifier results in the session identifier of 2222@172.19.3.3 (which comprises a random string (2222) and an IP address (172.19.3.3) for softswitch 120).

When softswitch 120 receives the SIP PUBLISH message of step 2h it examines the CallID field in the voice quality session report (VQSessionReport) in the SIP body of the SIP PUBLISH message to find a session identifier of 2222@172.19.3.3. Softswitch 120 consults database 116 and recognises that this session identifier relates to the communication session between endpoint device E1 and endpoint device E2, in particular the session identifier identified in the Call-ID field used in previous signalling for the segment between softswitch 120 and SBC 2. Softswitch 120 is thus able to react to the communication session quality report accordingly in relation to the correct communication session.

An example of a communication session quality reporting signalling message is given as follows:

```
PUBLISH sip:collector@example.org SIP/2.0
  Via: SIP/2.0/UDP pc22.example.org;branch=z9hG4bK3343d7
  Max-Forwards: 70
  To: <sip:proxy@example.org>
  From: Alice <sip:alice@example.org>;tag=a3343df32
  Call-ID: 1890463548
  CSeq: 4331 PUBLISH
  Allow: INVITE, ACK, CANCEL, OPTIONS, BYE, REFER,
     SUBSCRIBE, NOTIFY
  Event: vq-rtcpxr
  Accept: application/sdp, message/sipfrag
  Content-Type: application/vq-rtcpxr
  Content-Length: . . .
  VQSessionReport: CallTerm
  CallID: 6dg37f1890463
  LocalID: Alice <sip:alice@example.org>
  RemoteID: Bill <sip:bill@example.net>
  OrigID: Alice <sip:alice@example.org>
  LocalGroup: example-phone-55671
  RemoteGroup: example-gateway-09871
  LocalAddr: IP=10.10.1.100 PORT=5000 SSRC=1a3b5c7d
  LocalMAC: 00:1f:5b:cc:21:0f
  RemoteAddr:IP=11.1.1.150 PORT=5002 SSRC=0x2468abcd
  RemoteMAC: 00:26:08:8e:95:02
  LocalMetrics:
  Timestamps:START=2004-10-10T18:23:43Z
  STOP=2004-10-01T18:26:02Z
  SessionDesc:PT=18 PD=G729 SR=8000 FD=20
  FO=20 FPP=2 PPS=50
     FMTP="annexb=no" PLC=3SSUP=on
  JitterBuffer:JBA=3 JBR=2 JBN=40 JBM=80 JBX=120
  PacketLoss:NLR=5.0 JDR=2.0
  BurstGapLoss:BLD=0 BD=0 GLD=2.0 GD=500 GMIN=16
  Delay:RTD=200 ESD=140 SOWD=200 IAJ=2 MAJ=10
  Signal:SL=-21 NL=-50 RERL=55
  QualityEst:RLQ=90 RCQ=85 EXTRI=90
```

-continued

```
MOSLQ=4.2 MOSCQ=4.3
   QoEEstAlg=P.564
RemoteMetrics:
Timestamps:START=2004-10-10T18:23:43Z
STOP=2004-10-01T18:26:02Z
SessionDesc:PT=18 PD=G729 SR=8000 FD=20
FO=20 FPP=2 PPS=50
      FMTP="annexb=no" PLC=3 SSUP=on
JitterBuffer:JBA=3 JBR=2 JBN=40 JBM=80 JBX=120
PacketLoss:NLR=5.0 JDR=2.0
BurstGapLoss:BLD=0 BD=0 GLD=2.0 GD=500 GMIN=16
Delay:RTD=200 ESD=140 SOWD=200 IAJ=2 MAJ=10
Signal:SL=-21 NL=-45 RERL=55
QualityEst:RLQ=90 RCQ=85 MOSLQ=4.3 MOSCQ=4.2
QoEEstAlg=P.564
DialogID:1890463548@alice.example.org;to-tag=8472761;
   from-tag=9123dh311
```

In the above example, the quality reporting signalling message is a Voice Quality Metric (VQM) report. The CallID field which is encrypted as it passes through an application gateway according to embodiments is shown in bold.

In alternative embodiments, one or more of endpoint devices E1 and E2 generates statistics for the quality of communication in the communication session and reports such statistics to softswitch 120 after termination of the communication session. In the example of a SIP communication session, this could be after transmittal of one or more SIP BYE signalling messages by one or more devices in the signalling path for the communication session. SBC 1 and/or SBC 2 are able to handle processing of call identifiers for such 'final', i.e. post session termination, reports even after termination of the session in a similar manner to reports received whilst the communication session is still taking place. Embodiments thus do not require any network address translation lookup tables to be stored by SBC 1 or SBC 2 during the communication session or maintained after termination of the communication session; SBC 1 and SBC 2 store and refer to an encryption key 304 and a deterministic encryption algorithm. SBC 2 stores and refers to a decryption key 306 and an inverse of the deterministic encryption algorithm. The encryption key 304 and the decryption key may be the same key, or may be different, related keys. The encryption key 304 and/or decryption key 306 can be retrieved from the appropriate database 104 or 110.

When an intermediate network device such as SBC 1 or SBC 2 receives a signalling message, a decision needs to be taken as to whether to carry out decryption or decryption of an identifier for the communication session such as a call identifier contained within the signalling message. To make this decision, the intermediate network device examines appropriate identifiers within the signalling message looking for at least a portion which identifies the intermediate network device.

If the intermediate network device determines that the received identifier does not comprise at least a portion identifying the intermediate network device, then the intermediate network device knows that the received identifier should be transformed using a deterministic encryption algorithm, i.e. encryption is carried out. This situation applies to the decision taken by SBC 1 between steps 2a and 2b and also between steps 2e and 2f described above. This situation also applies to the decision taken by SBC 2 between steps 2c and 2d described above.

Conversely, if the intermediate network device determines that the received identifier does comprise at least a portion identifying the intermediate network device, then the intermediate network device knows that the received identifier should be transformed using an inverse of the deterministic encryption algorithm, i.e. decryption is carried out. This situation applies to the decision taken by SBC 2 between steps 2g and 2h described above.

In embodiments, the type of incoming signalling messages is monitored in order to identify which messages an encryption or decryption transformation should be applied to. If the monitoring detects that a signalling message is of a communication session setup type, then an encryption or decryption transformation should be applied to the appropriate identifier contained within the SIP header of the message, for example the Call-ID. Similarly, if the monitoring detects that a signalling message is of a communication session quality reporting type, then an encryption or decryption transformation should be applied to the appropriate identifier contained within a quality report in the SIP body of the message, for example the session identifier in the CallID field. If the monitoring detects other types of signalling messages, then no transformation of identifiers may be carried out.

In embodiments, the transformation of an identifier in a received signalling message is carried out by a session border controller located between signalling segments on the incoming and outgoing directions of the signalling path. The transformation is applied to the entire contents of the received identifier and the result of the transformation is added as a prefix to a network address of the session border controller to form the identifier in the transmitted signalling message.

Figure 3:
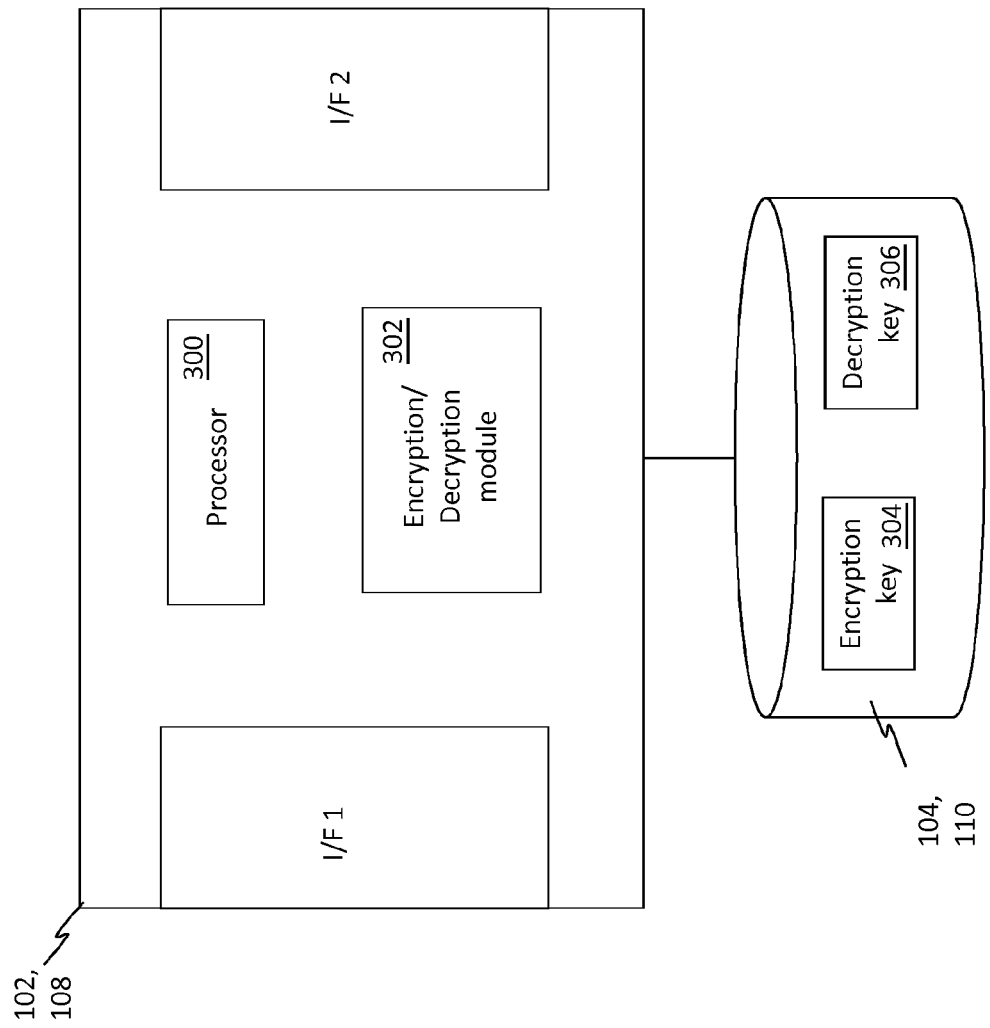
FIG. 3 is a block diagram showing components of an application gateway according to embodiments.

FIG. 3 is a block diagram showing components of an application gateway according to embodiments. In these example embodiments, the application gateway comprises a session border controller, for example SBC 1 or SBC 2 described above, for processing communication sessions in a telecommunications network. Each communication session has a signalling path spanning a plurality of devices including one or more session border controllers, a softswitch and at least two endpoint devices. The signalling path comprises a first signalling segment located between one of the endpoint devices and the session border controller, and a second signalling segment located between the session border controller and the softswitch.

The session border controller 102, 108 comprises a first interface, I/F 1, configured to receive, via the first signalling segment for a communication session, a first signalling message comprising a first identifier associated with the communication session. The session border controller 102, 108 comprises a processor 300 configured to transform at least part of the first identifier using a deterministic encryption algorithm to generate a second identifier. Further, the session border controller 102, 108 comprises a second interface, I/F 2, configured to transmit, via the second signalling segment for the communication session, a second signalling message comprising the second identifier to associate the second identifier with the communication session.

The session border controller 102, 108 has access to a database 104, 110, either located integrally or remotely from session border controller 102, 108. The transformation is carried out by processor 300 with reference to an encryption/decryption module 302 which performs either an encryption of the input identifier by retrieving an encryption key 304 from database 104, 110 or a decryption of the input identifier by retrieving a decryption key 306 from database 104, 110. In practice, session border controller 102, 108 will process signalling messages for a plurality of other endpoint or intermediate network devices (not shown) via a plurality of ports and/or trunk connections.

In embodiment described above, the deterministic encryption algorithm could for example comprise AES (Advanced Encryption Standard) or RC4 (Rivest Cipher 4).

The deterministic encryption algorithm has been described in the above embodiments as being reversible. In other embodiments, a non-reversible deterministic encryption algorithm could be employed, for example in SBC 1 where decryption is not required (whereas decryption is required in SBC 2).

In the above embodiments, the output of the deterministic encryption algorithm does not change for the same input. However, in alternative embodiments, the output of the encryption algorithm may alternatively change in a deterministic manner, for example according to the time at which the algorithm is applied. The time could be based on the time given in an accompanying timestamp. In such embodiments which use a technique alternative to those described previously, the first identifier is encrypted using a given encryption algorithm, for example by SBC 1. A downstream device in the signalling path for the communication session, for example softswitch 120, which receives the second signalling message needs to be able to process the second identifier correctly. This can be achieved by implementing sharing of the given encryption algorithm, i.e. both SBC 1 and softswitch 120 have knowledge of how the given encryption algorithm operates, for example including how its output varies with time.

As an example, the shared algorithm could involve SBC 1 using a first encryption algorithm during evenly numbered hours of the day and using a second, different encryption algorithm using oddly numbered hours of the day. If softswitch 120 has knowledge of the odd/even hour schedule by which SBC 1 decides which of the first and second encryption algorithms to use, then softswitch 120 will be able to process the two different identifiers received in signalling messages during such periods correctly and identify them as relating to the same session. Other forms of shared encryption algorithm could also be employed, similarly for the case of decryption.

The above embodiments are to be understood as illustrative examples. Further embodiments are envisaged.

In the embodiments described above, the session identifier is initially generated by the combination of a random string and an IP address for the originating endpoint device. In alternative embodiments, the session identifier may be generated by the combination of a random string and a hostname for the originating endpoint device.

In embodiments described above, the signalling messages received by SBC 1 or SBC 2 are received via segments of the communication session from devices in the signalling path for the communication session. In alternative embodiments, one or more signalling messages could be received from devices not in the signalling path for the session. This could for example be the case in a law enforcement scenario in relation to legal media tapping of a communication session. In such a scenario, network 'sniffing' of signalling messages to/from an endpoint device or application gateway could be carried out by a law enforcement agency to ascertain a session identifier associated with a communication session. The session identifier could then be used in signalling messages sent to the application gateway, which would carry out the appropriate encryption/decryption of the session identifier, thus allowing the law enforcement agency to 'listen-in' on traffic for the communication session.

The embodiments depicted in FIG. 2 involve endpoint devices E1 and E2 reporting communication session quality using SIP PUBLISH signalling messages. In other embodiments, one or more SIP NOTIFY signalling messages could be employed, or a combination thereof.

The embodiments depicted in FIG. 2 involve endpoint devices E1 and E2 carrying out communication session setup processes using SIP INVITE messages. In other embodiments, one or more SIP SUBSCRIBE or SIP REFER signalling messages could be employed, or a combination thereof.

Some embodiments described above involve encryption/decryption of identifiers in relation to communication session quality reporting signalling. The techniques described herein can be applied to other processes where call references exist such as the replaces or target-dialog packages used in SIP call transfer operations.

Examples embodiments described above apply the techniques described herein in a SIP environment. The techniques described herein can also be applied in relation to other IP telephony or IP communication environments, for example in relation to International Telecommunication Union Telecommunication Standardization Sector (ITU-T) recommendation H.323, or the Media Gateway Control Protocol (MGCP), etc.

The techniques described herein can be applied in relation to Voice over Internet Protocol (VoIP) communication sessions involving transfer of voice or other audio data between endpoint devices. The techniques described herein can also be applied in relation to Communications over Internet Protocol (CoIP) communication sessions, for example involving transfer of multimedia data including text, image, video and other forms of digital data in addition to or alternatively to voice or audio data.

Embodiments comprise measures, including methods, apparatus and computer program products, for processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:

receiving, via a first signalling segment for a communication session, a first communication session setup signalling message comprising a first identifier associated with the communication session;

transforming at least part of the first identifier using a deterministic encryption algorithm to generate a second identifier;

transmitting, via a second signalling segment for the communication session, a second communication session setup signalling message comprising the second identifier to associate the second identifier with the communication session;

receiving, via the second signalling segment, a first quality reporting signalling message for the communication session, the first quality reporting signalling message comprising the second identifier;

transforming at least part of the second identifier from the first quality reporting signalling message using an inverse of the deterministic encryption algorithm to generate the first identifier associated with the communication session; and transmitting, via the first signalling segment, a second quality reporting signalling message comprising the first identifier generated from the transforming.

Embodiments comprise measures, including methods, apparatus and computer program products, for processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:

receiving, via a first signalling segment for a communication session, a first communication session setup signalling message comprising a first identifier associated with the communication session;

transforming at least part of the first identifier using a deterministic encryption algorithm to generate a second identifier;

transmitting, via a second signalling segment for the communication session, a second communication session setup signalling message comprising the second identifier to associate the second identifier with the communication session;

receiving, via the first signalling segment, a first quality reporting signalling message for the communication session, the first quality reporting signalling message comprising the first identifier;

further transforming at least part of the first identifier from the first quality reporting signalling message using the deterministic encryption algorithm to generate the second identifier associated with the communication session; and transmitting, via the second signalling segment, a second quality reporting signalling message comprising the second identifier generated from the further transforming.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing communication sessions in a telecommunications network, each communication session having a signalling path spanning a plurality of devices including one or more intermediate network devices and at least two endpoint devices, the signaling path comprising a plurality of signalling segments, each segment being between two devices in the plurality of devices, the method comprising:

receiving, via a first signalling segment for a communication session, a first signaling message comprising a first identifier associated with the communication session;

transforming at least part of the first identifier using a deterministic encryption algorithm to generate a second identifier;

transmitting, via a second signalling segment for the communication session, a second signalling, message comprising the second identifier to associate the second identifier with the communication session;

receiving a third signalling message comprising the second identifier;

transforming at least part of the second identifier from the third signalling message using an inverse of the deterministic encryption algorithm to generate the first identifier associated with the communication session; and transmitting a fourth signalling message comprising the first identifier generated from the transformation of at least part of the second identifier from the third signalling message.

2. The method according to claim 1, wherein the first signalling message comprises a first communication session setup signalling message for the communication session and the second signalling message comprises a second communication session setup signalling message for the communication session.

3. The method according to claim 1, wherein the first identifier is received at an intermediate network device, the method further comprising:

determining that the received first identifier does not comprise at least a portion identifying the intermediate network device, wherein the transforming of at least part of the first identifier is carried out in response to the determination.

4. The method according to claim 1, wherein the third signalling message comprises a first quality reporting signalling message for the communication session and is received via the second signalling segment, and the fourth signalling message comprises a second quality reporting signalling message and is transmitted via the first signalling segment.

5. The method according to claim 4, wherein the first quality reporting signalling message is received during the communication session.

6. The method according to claim 4, wherein the first quality reporting signalling message is received after termination of the communication session.

7. The method according to claim 1, wherein the second identifier is received at an intermediate network device, the method further comprising:

determining that the received second identifier comprises at least a portion identifying the intermediate network device, wherein the transforming of at least part of the second identifier is carried out in response to the determination.

8. The method according to claim 1, wherein the first signalling message comprises a first quality reporting signalling message for the communication session and the second signalling message comprises a second quality reporting signalling message for the communication session.

9. The method according to claim 1, further comprising detecting that the first signalling message is of a communication session quality reporting type, wherein the transformation is carried out in response to the detection.

10. The method according to claim 1, wherein the first identifier includes a portion comprising a network address for at least one device in the signalling path of the communication session.

11. The method according to claim 10, wherein the at least one device comprises an endpoint device, and the first signalling message is generated by the endpoint device.

12. The method according to claim 10, wherein the at least one device comprises a softswitch, and the first signalling message is generated by the softswitch.

13. The method according to claim 1, wherein the communication session comprises a Session Initiation Protocol (SIP) communication session, the first and second signalling messages comprise first and second SIP signalling messages, and the first and second identifiers are session identifiers contained in respective session identifier fields of the first and second SIP signalling messages.

14. The method according to claim 13, wherein the first and second signalling messages comprise one or more of:

SIP INVITE messages,
SIP SUBSCRIBE messages,
SIP REFER messages,
SIP NOTIFY messages, and
SIP PUBLISH messages.

15. The method according to claim 1, wherein the transformation of the first identifier is carried out by a session border controller located between the first and second signalling segments, the transformation is applied to the entire contents of the first identifier and the result of the transformation is added as a prefix to a network address of the session border controller to form the second identifier.

16. A session border controller for processing communication sessions in a telecommunications network, each communication session having a signalling path spanning a plurality of devices including one or more session border controllers, a softswitch and at least two endpoint devices, the signalling path comprising a first signalling segment located between one of the endpoint devices and the session border controller, and a second signalling segment located between the session border controller and the softswitch, the session border controller comprising:
- a first interface configured to receive, via the first signalling segment for a communication session, a first signalling message comprising a first identifier associated with the communication session;
- a processor configured to transform at least part of the first identifier using a deterministic encryption algorithm to generate a second identifier;
- a second interface configured to transmit, via the second signalling segment for the communication session, a second signalling message comprising the second identifier to associate the second identifier with the communication session;
- a third interface configured to receive, via the second signalling segment for the communication session, a third signalling message comprising the second identifier;
- a processor configured to transform at least part of the second identifier from the third signalling message using an inverse of the deterministic encryption algorithm to generate the first identifier associated with the communication session; and
- a fourth interface configured to transmit, via the first signalling segment for the communication session, a fourth signalling message comprising the first identifier generated from the transformation of at least part of the second identifier from the third signalling message.

17. A computer program product comprising a non-transitory computer-readable storage medium having computer readable instructions stored thereon, the computer readable instructions being executable by a computerized device to cause the computerized device to perform a method for processing communication sessions in a telecommunications network, each communication session having a signalling path spanning a plurality of devices including one or more intermediate network devices and at least two endpoint devices, the signalling path comprising a plurality of signalling segments, each segment being between two devices in the plurality of devices, the method comprising:
- receiving, via a first signalling segment for a communication session, a first signalling message comprising a first identifier associated with the communication session;
- transforming at least part of the first identifier using a deterministic encryption algorithm to generate a second identifier;
- transmitting, via a second signalling segment for the communication session, a second signalling message comprising the second identifier to associate the second identifier with the communication session;
- receiving a third signaling message comprising the second identifier;
- transforming at least part of the second identifier from the third signalling message using an inverse of the deterministic encryption algorithm to generate the first identifier associated With the communication session; and
- transmitting a fourth signalling message comprising the first identifier generated from the transformation of at least part of the second identifier from the third signalling message.

\* \* \* \* \*